United States Patent
Hwang et al.

(10) Patent No.: US 8,605,657 B2
(45) Date of Patent: Dec. 10, 2013

(54) MESH ROUTING METHOD AND MESH ROUTING APPARATUS IN BEACON ENABLED WIRELESS AD-HOC NETWORKS

(75) Inventors: So Young Hwang, Busan (KR); Jong Jun Park, Daejeon (KR); Hoon Jeong, Daejeon (KR); Bong Soo Kim, Daejeon (KR); Seong Soon Joo, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 298 days.

(21) Appl. No.: 12/970,565

(22) Filed: Dec. 16, 2010

(65) Prior Publication Data

US 2011/0149858 A1    Jun. 23, 2011

(30) Foreign Application Priority Data

Dec. 18, 2009   (KR) .................. 10-2009-0127487
Apr. 21, 2010   (KR) .................. 10-2010-0036815

(51) Int. Cl.
*H04Q 7/00*     (2006.01)
*H04L 12/28*    (2006.01)

(52) U.S. Cl.
USPC ........................................ 370/328; 370/389

(58) Field of Classification Search
USPC ................. 370/310, 328, 338, 389, 392, 401
See application file for complete search history.

(56) References Cited

U.S. PATENT DOCUMENTS

| | | | |
|---|---|---|---|
| 7,675,863 B2 * | 3/2010 | Werb et al. | 370/241 |
| 7,751,420 B2 * | 7/2010 | Tsubota | 370/428 |
| 7,808,960 B1 * | 10/2010 | Chan et al. | 370/338 |
| 7,890,112 B2 * | 2/2011 | Ito et al. | 455/445 |
| 2006/0178156 A1 | 8/2006 | Kim | |
| 2007/0147255 A1 * | 6/2007 | Oyman | 370/238 |

FOREIGN PATENT DOCUMENTS

| | | |
|---|---|---|
| KR | 10-2006-0083543 | 7/2006 |
| KR | 10-2009-0070567 | 7/2009 |

OTHER PUBLICATIONS

Perkins et al., Ad hoc On-Demand Distance Vector (AODV) Routing, Jun. 2002, IETF.*
Transmission Control Protocol, Sep. 1981, IETF.*
Transmission Control Protocol, 1981, IETF.*
He et al., Speed: A Stateless Protocol for Real-Time Communication in Sensor Networks, 2003, IEEE.*
Perkins et al. Ad hoc On-Demand Distance Vector (AODV) Routing, 2002, IETF.*

* cited by examiner

*Primary Examiner* — Hong Cho
(74) *Attorney, Agent, or Firm* — Staas & Halsey LLP

(57) ABSTRACT

There is provided a mesh routing method in beacon-enabled wireless AD-HOC networks that includes: broadcasting, by nodes constituting a wireless AD-HOC network, a beacon message loading neighbor node information on a beacon payload; managing, by a node receiving the broadcasted beacon message, its own neighbor node table by extracting the neighbor node information loaded on the beacon payload; and performing, by a source node attempting to transmit data or commands, mesh routing on the basis of its own neighbor node table.

13 Claims, 3 Drawing Sheets

MESH ROUTING METHOD AND MESH ROUTING APPARATUS IN BEACON ENABLED WIRELESS AD-HOC NETWORKS

CROSS-REFERENCE TO RELATED APPLICATIONS

This application claims the priorities of Korean Patent Application Nos. 10-2009-0127487 filed on Dec. 18, 2009 and 10-2010-0036815 filed on Apr. 21, 2010, in the Korean Intellectual Property Office, the disclosures of which are incorporated herein by reference.

BACKGROUND OF THE INVENTION

1. Field of the Invention

The present invention relates to a mesh routing method and a mesh routing apparatus in beacon enabled wireless AD-HOC networks, and more particularly, to a technology for enabling mesh routing having reliability and extensibility while minimizing the generation of additional control traffic for setting a route at the time of setting the route for transmitting data and commands between nodes in beacon enabled wireless AD-HOC networks.

2. Description of the Related Art

There are provided various routing techniques for transmitting data and commands between nodes under a wireless sensor network environment represented as a low-power wireless AD-HOC network. In particular, in recent years, mesh routing has needed to be supported by considering reliability and extensibility, and representative prior art may include a low-rate WPAN mesh of IEEE 802.15.5 and a mesh routing technique based on an Ad hoc On demand Distance Vector (AODV) proposed by the ZigBee alliance.

The low-rate WPAN mesh of IEEE 802.15.5 operates based on IEEE 802.15.4 PHY/MAC, performs block addressing around a mesh coordinator, collects information regarding neighbor nodes within the number of hops designated by nodes by periodically broadcasting a "hello" command within the designated number of hops, and manages the neighbor node information as a neighbor node table so as to enable mesh routing. However, in this case, since the "hello" command needs to be periodically broadcasted for mesh routing, the load is exponentially increased when the density of nodes constituting a network increases.

Meanwhile, in the mesh routing technique proposed by the ZigBee alliance, a source node broadcasts a route request (RREQ) message in order to retrieve a route for reaching a destination node and the destination node receiving the RREQ message transfers a route reply (RREP) message up to the source node to establish a route between a source and a destination by employing an AODV scheme proposed in the prior MANET. However, since this method also is based on the broadcasting of the RREQ message, the load of control traffic for setting the route is very large.

SUMMARY OF THE INVENTION

An aspect of the present invention provides a mesh routing method and a mesh routing apparatus in beacon-enabled wireless AD-HOC networks for enabling mesh routing having reliability and extensibility while minimizing the generation of additional control traffic for setting a route at the time of setting the route for transmitting data and commands between nodes in the beacon enabled wireless AD-HOC networks.

According to an aspect of the present invention, there is provide a mesh routing method in beacon-enabled wireless AD-HOC networks that includes: broadcasting, by each node constituting a wireless AD-HOC network, a beacon message loading neighbor node information on a beacon payload; managing, by a node receiving the broadcasted beacon message, its own neighbor node table by extracting the neighbor node information loaded on the beacon payload; and performing, by a source node attempting to transmit data or commands, mesh routing on the basis of its own neighbor node table.

At this time, the neighbor node information may be a list of addresses of neighbor nodes.

Further, the beacon payload may further include a flag field for indicating that the neighbor node information loaded on the beacon payload is changed or marking the number of the neighbor node information segmented depending on the size of the beacon payload.

The performing of the mesh routing may include: checking, by the source node, whether or not information on a destination node is included in its own neighbor node table; extracting information on the next hop on a route to the destination node from the neighbor node table when the information on the destination node is included in the neighbor node table; and transmitting the data or commands to a node corresponding to the extracted next hop, wherein the extracting of the next hop information and the transmitting of the data or commands are repetitively performed until the data or commands reach the destination node.

The performing of the mesh routing may further include: determining the next hop on the basis of an address of the destination node when the information on the destination node is not included and the address assignment scheme applied to the wireless AD-HOC network is address-based routable; and transmitting the data or commands to a node corresponding to the determined next hop and the node that is determined as the next hop to receive the data or commands may check whether or not the information on the destination node is included in its own neighbor node table and may enter the extracting of the next hop information or the determining of the next hop depending on the checking result.

The performing of the mesh routing may further include: broadcasting, by the source node, an RREQ (Route Request) when the information on the destination node is not included and the address assignment scheme applied to the wireless AD-HOC network is not address-based routable; checking, by a node receiving the RREQ, whether or not the information on the destination node is included in its own neighbor node table; transmitting, by the node receiving the RREQ, an RREP (Route replay) to the source node when the information on the destination node is included in the neighbor node table of the node receiving the RREQ; and transmitting, by the source node, the data or commands to the node transmitting the RREP, and the mesh routing method may further include continuously relaying, by the node receiving the RREQ, the RREP when the information on the destination node is not included in the neighbor node table of the node receiving the RREQ.

Meanwhile, according to another aspect of the present invention, there is provided a mesh routing apparatus in beacon-enabled wireless AD-HOC networks that includes: a beacon message generator generating a beacon message by loading neighbor node information on a beacon payload; a neighbor node information manager managing a neighbor node table by extracting neighbor node information loaded on a beacon message received from another node; a routing executor executing mesh routing on the basis of the neighbor node table; a neighbor node information database storing the neighbor node table; and a transceiver transmitting and receiving a message to and from another node.

At this time, the routing executor may check whether or not information on a destination node is included in the neighbor node table, when the information on the destination node is included in the neighbor node table, extract information on the next hop on a route to the destination node from the neighbor node table, and transmit data or commands to a node corresponding to the extracted next hop.

On the contrary, the routing executor may determine the next hop on the basis of an address of the destination node when the information on the destination node is not included and the address assignment scheme applied to the wireless AD-HOC network is address-based routable, and transmit the data or commands to a node corresponding to the determined next hop, and the routing executor may broadcast an RREQ (Route Request) when the address assignment scheme applied to the wireless AD-HOC network is not address-based routable and transmit the data or command to the node transmitting an RREP (Route reply) when receiving the RREP as a replay for the RREQ.

The routing executor may check whether or not the information on the destination node is included in the neighbor node table when receiving the RREQ from another node, transmit the RREP to the source node when the information on the destination node is included, and continuously relay the RREP when the information on the destination node is not included.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
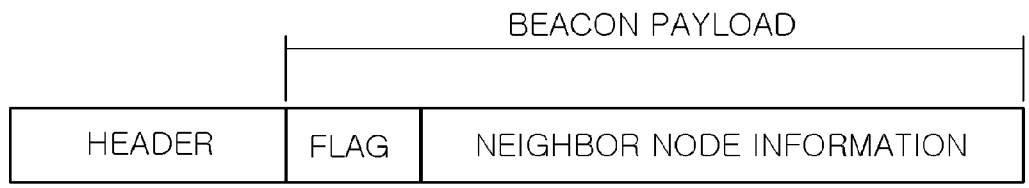
FIG. 1 is a diagram illustrating one example of a beacon message format used in the present invention.

Exemplary embodiments will now be described in detail with reference to the accompanying drawings so that they can be easily practiced by a person skilled in the art to which the present invention pertains. However, in describing the exemplary embodiments of the present invention, detailed descriptions of well-known functions or constructions are omitted so as not to obscure the description of the present invention with unnecessary detail. In addition, like reference numerals denote parts performing similar functions and actions throughout the drawings.

Throughout this specification, when it is described that an element is "connected" to another element, the element may be "directly connected" to another element or "indirectly connected" to another element through a third element. In addition, unless explicitly described otherwise, "comprising" any components will be understood to imply the inclusion of other components but not the exclusion of any other components.

The present invention is used to apply beacon-enabled wireless AD-HOC networks capable of retrieving neighbor nodes by periodic transmission of a beacon message in an MAC layer.

In the beacon-enabled wireless AD-HOC networks, when a new node is accessed, beacon messages transmitted by neighbor nodes are received to determine information regarding the neighbor nodes and select a node to be accessed. Further, even after accessing is completed, a change of neighbor nodes is detected by periodically receiving the beacon messages.

In the present invention, the neighbor node information collected while the new node accesses the wireless AD-HOC networks or a list of addresses of neighbor nodes collected from the beacon messages periodically received after the new node accesses the network is loaded on a beacon payload in the beacon message periodically broadcasted by the MAC layer and broadcasted and the node that receives the beacon messages from the neighbor nodes generates and manages its own neighbor node table by extracting the neighbor node address list mounted on the beacon payload and perform mesh routing on the basis of the neighbor node table.

Hereinafter, referring to FIGS. 1 to 7, a mesh routing method and a mesh routing apparatus in beacon-enabled wireless AD-HOC networks according to an exemplary embodiment of the present invention will be described in more detail.

FIG. 1 is a diagram illustrating one example of a beacon message format used in the present invention.

In the present invention, each node loads neighbor node information, that is, a list of addresses of neighbor nodes on a beacon payload and broadcasts it as shown in FIG. 1. At this time, the scope of the neighbor node information loaded on the beacon payload may be determined depending on a value previously set by a user or a manager.

Further, a flag field in addition to the neighbor node information is included in the beacon payload, when the neighbor node information loaded on the beacon payload is changed or the message is segmented, so as to enhance efficiency in table management and processing of the corresponding message by marking it.

Specifically, only when the neighbor node information is changed, the flag field is marked and the neighbor node information is loaded on the beacon payload so as for nodes that receive the beacon message to update a neighbor node table.

Further, when the scope of designated neighbor nodes is large, for example, when up to 3-hop neighbor node information intends to be managed, the size of the neighbor node information to be loaded on the beacon payload may be larger than the size of a designated beacon payload. In this case, information indicating that the corresponding neighbor node information is transmitted by being segmented into several beacons is marked in the flag field and the corresponding neighbor node information may be transmitted several times to match the size of the designated beacon payload.

Each of the nodes constituting the wireless AD-HOC networks may transmit the neighbor node information within the designated scope to an adjacent node without generating additional control traffic according to the method described above.

Figure 2:
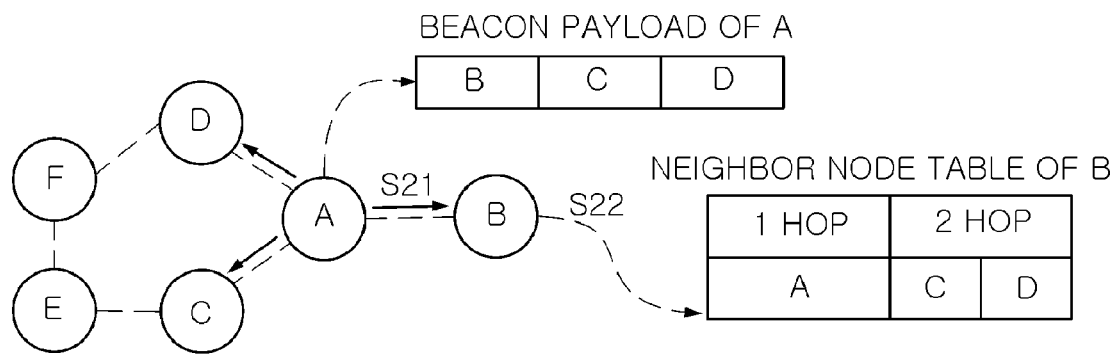
FIG. 2 is a diagram illustrating one example in which a node generates and manages a neighbor node table.

FIG. 2 is a diagram illustrating one example in which a node generates and manages a neighbor node table.

As shown in FIG. 2, a node A loads its own neighbor node information, i. e., addresses of nodes B, C, and D on a beacon payload and thereafter, broadcasts a beacon message (S21).

Thereafter, the node B receives the beacon message broadcasted by the node A, and generates and manages its own neighbor node table by referring to the received beacon message (S22).

As shown in FIG. 2, the node A broadcasts the beacon message and the node B generates and manages the neighbor node table, but each node shown in FIG. 2 broadcasts the beacon message loaded with its own neighbor node information and each node that receives the broadcasted beacon message may generate and manage its own neighbor node table.

Further, in FIG. 2, an example in which the node B generates a 2-hop neighbor node table is shown, but the scope of a neighbor node managed by the neighbor node table may be determined depending on a value previously set by a user or a manager.

For example, in order to generate a 1-hop neighbor node table, each node may broadcast the beacon message without loading the neighbor node information on the beacon payload. A node that receives the broadcasted beacon message may generate the 1-hop neighbor node table by adding only information on a node that transmits the beacon message to its own neighbor node table.

Further, in order to generate the 2-hop neighbor node table, each node may load 1-hop neighbor node information collected while accessing the network or 1-hop neighbor node information collected by receiving the beacon message on the beacon payload and thereafter, broadcast the beacon message. A node that receives the broadcasted beacon message within a predetermined beacon reception period may generate a 2-hop neighbor node table by adding information on a node that transmits the beacon message and neighbor node information loaded on the received beacon message to its own neighbor node table.

Further, in order to generate 3-hop or more neighbor node tables, the corresponding tables may be generated in the same manner as above.

Since the beacon message is periodically broadcasted, each node constituting the wireless AD-HOC network periodically transmits and receives its own neighbor node information to maintain and manage the neighbor node table.

In the present invention, when a predetermined node that constitutes the wireless AD-HOC network attempts to transmit data or commands to a designated destination node, the corresponding node first checks whether or not information on the destination node is included in a neighbor node table managed by the corresponding node and transmits the data or commands through different processes depending on whether or not the destination node information is included in the neighbor node table. Hereinafter, referring to FIGS. 3 and 4, such a process will be described in detail.

Figure 3:
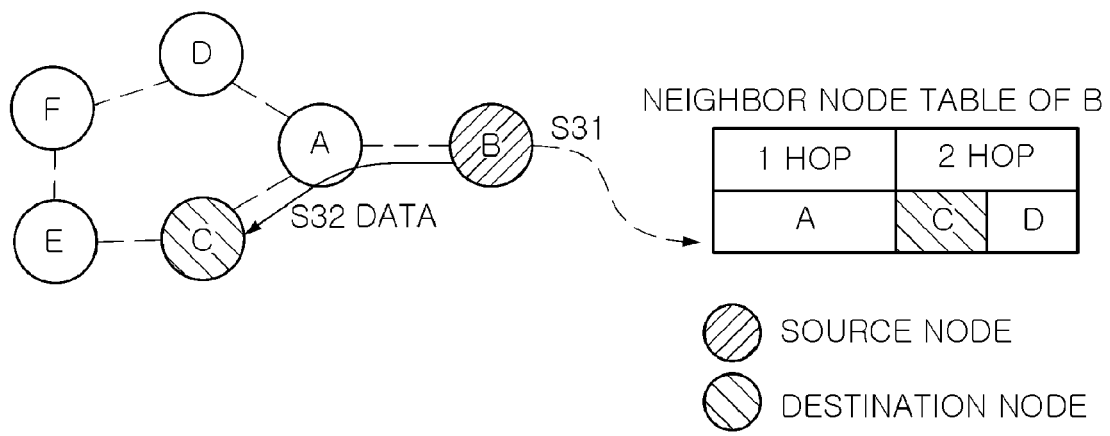
FIG. 3 is a diagram illustrating one example in which when a destination node is included in a neighbor node table of a source node, data are transmitted to the destination node depending on information of the neighbor node table.

FIG. 3 is a diagram illustrating one example in which when a destination node is included in a neighbor node table of a source node, data are transmitted to the destination node depending on information of the neighbor node table.

Referring to FIG. 3, when a source node B attempts to transmit data to a destination node C, the source node B first checks whether or not information on the destination node C is included in its own neighbor node table (S31).

When the information on the destination node C is included in its own neighbor node table, the source node B extracts information on a next hop on a route to the destination node C, i.e., an address of a node A to transmit the data to the node A. The node A that receives the data checks whether or not a destination address of the data is the same as its own address and when the corresponding address is not the same as its own address, the node A transmits the data to the destination node C by repetitively performing such a process (S32).

Figure 4:
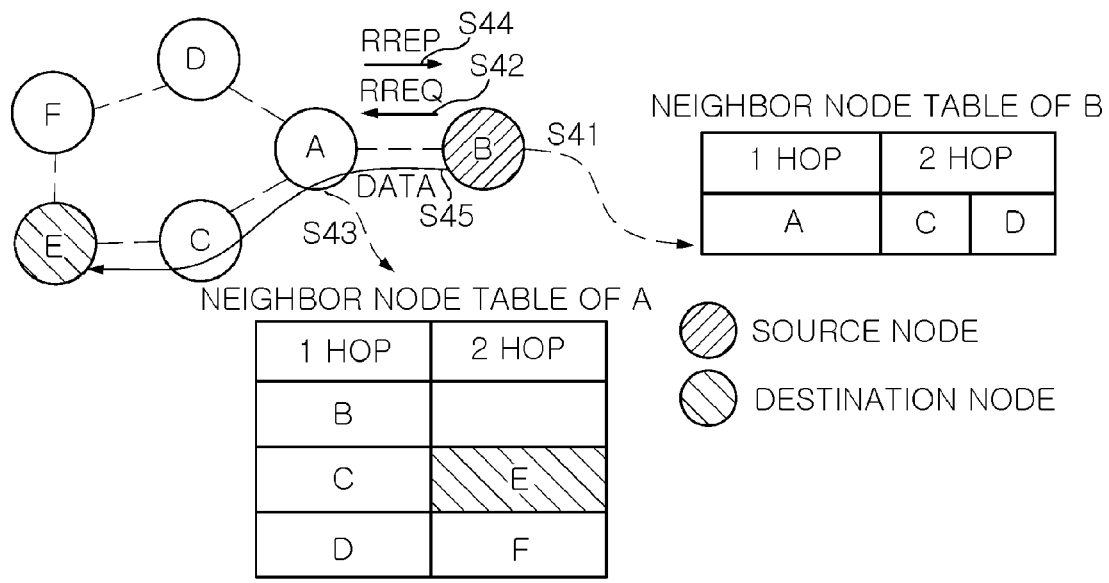
FIG. 4 is a diagram illustrating one example in which when a destination node is not included in a neighbor node table of a source node, a route to the destination node is found by broadcasting RREQ and data is transmitted to the destination node.

FIG. 4 is a diagram illustrating one example in which when a destination node is not included in a neighbor node table of a source node, a route to the destination node is found by broadcasting a RREQ and data is transmitted to the destination node.

When the source node B attempts to transmit data to a destination node E, the source node B first checks whether or not information on the destination node E is included in its own neighbor node table (S41).

Even when the information on the destination node E is not included in its own neighbor node table and an address assignment scheme applied to the corresponding AD-HOC network is not an address based routable scheme, the source node B broadcasts the route request (RREQ) in order to set a route to the destination node E (S42).

In this case, the RREQ is not continuously relayed until the RREQ reaches the destination node E, but each node that receives the RREQ retrieves its own neighbor node table to check whether or not the information on the destination node E is included in its own neighbor node table before relaying the RREQ. At this time, when the information on the destination node E is included in its own neighbor node table, the node immediately transmits a route reply (RREP) as a reply so as to rapidly set the route and prevent unnecessary control traffic from being generated.

In other words, the node A that receives the RREQ from the source node B retrieves its own neighbor node table to check whether or not the information on the destination node E is included in its own neighbor node table (S43) and when it is verified that the information on the destination node E is included in its own neighbor node table from the checking result, the node A transmits the RREP to the source node B (S44).

As a result, the source node B transmits the data to the node A and the node that receives the data transmits the data to the destination node E on the basis of its own neighbor node table as described above with reference to FIG. 3 (S45).

Meanwhile, the information regarding the destination node E is not included in the neighbor node table of the source node B, but when the address assignment scheme applied to the corresponding wireless AD-HOC network is address-based routable, the data is transmitted to a designated location on the basis of the address assignment scheme without broadcasting the RREQ.

For example, when a CSkip scheme which is the distributed address assignment scheme proposed by the ZigBee alliance is applied, the source node B may determine any one between a parent node and a child node of the source node B to which the source node B will transmit the data when a destination address is given. Therefore, the source node B may transmit the data on the basis of the destination address.

Therefore, when the address assignment scheme is address-based routable, the source node determines the next hop on the basis of the destination address to transmit the data and a node that receives the data retrieves the corresponding neighbor node table and when information on a destination node is included in its own neighbor node table, the destination node transmits a message on the basis of its own node table and if not, determines the next hop on the basis of the destination address again to transmit the data. The source node may transmit the data to the destination node by repetitively performing the process.

Figure 5:
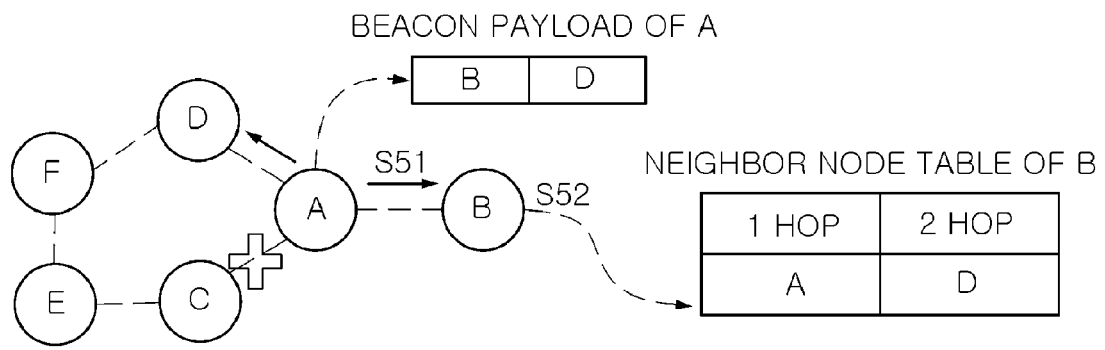
FIG. 5 is a diagram illustrating one example of updating a neighbor node table when neighbor node information is changed.

FIG. 5 is a diagram illustrating one example of updating a neighbor node table when neighbor node information is changed.

As shown in FIG. 5, when the neighbor node information regarding the node A is changed, the node A loads its own neighbor node information, i.e., the addresses of the nodes B and D on the beacon payload and marks the flag field, and thereafter, broadcasts the beacon message (S51).

Thereafter, the node B receives the beacon message broadcasted by the node A, and updates its own neighbor node table by referring to the received beacon message (S52).

Figure 6:
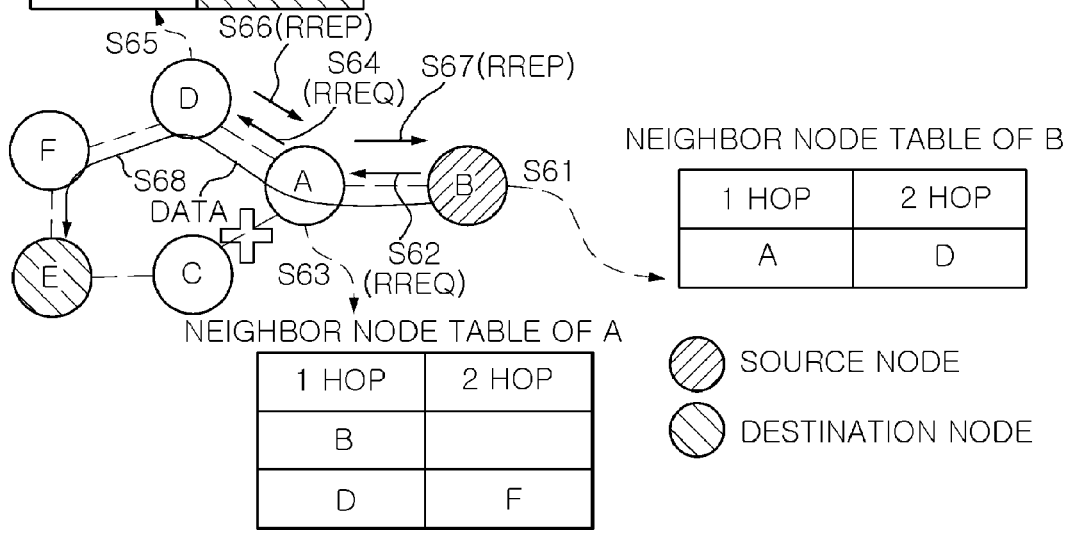
FIG. 6 is a diagram illustrating one example of finding a route to a destination node by broadcasting an RREQ and transmitting data to a destination node after updating a neighbor node table as shown in FIG. 5.

FIG. 6 is a diagram illustrating one example of finding a route to a destination node by broadcasting an RREQ and transmitting data to a destination node after updating a neighbor node table as shown in FIG. 5.

When the source node B attempts to transmit the data to the destination node E, the source node B first checks whether or not the information on the destination node E is included in its own neighbor node table (S61).

Even when the information on the destination node E is not included in its own neighbor node table and the address assignment scheme applied to the corresponding wireless AD-HOC network is not the address based routable scheme, the source node B broadcasts the RREQ in order to set the route to the destination node E (S62).

The node A that receives the RREQ from the source node B retrieves its own neighbor node table to check whether or not the information on the destination node E is included in its own neighbor node table (S63) and when the information on the destination node E is not included in its own neighbor node table from the checking result, the source node B continuously relays the RREQ (S64).

The node D that receives the RREQ from the source node A retrieves its own neighbor node table to check whether or not the information on the destination node E is included in its own neighbor node table (S65) and when it is verified that the information on the destination node E is included in its own neighbor node table from the checking result, the node D transmits the RREP to the source node B through the node A (S66 and S67).

As a result, the source node B transmits the data to the node D through the node A and the node D that receives the data transmits the data to the destination node E on the basis of its own neighbor node table as described above with reference to FIG. 3 (S68).

Figure 7:
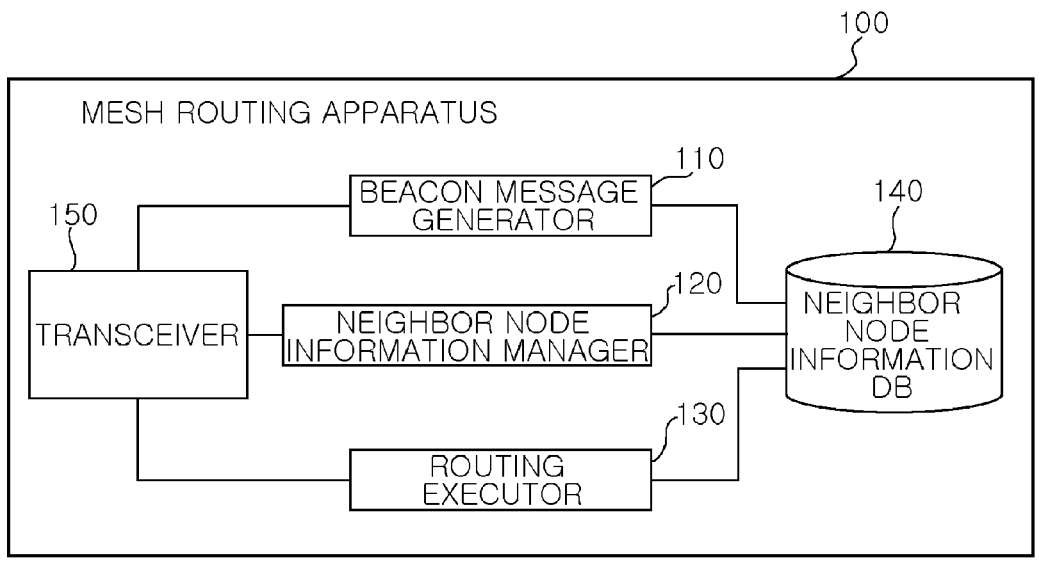
FIG. 7 is a diagram illustrating a configuration of a mesh routing apparatus according to the present invention.

FIG. 7 is a diagram illustrating a configuration of a mesh routing apparatus according to the present invention.

The mesh routing apparatus 100 according to the present invention as an apparatus that is installed at each node constituting the wireless AD-HOC network and performs routing depending on the above-mentioned mesh routing method includes a beacon message generator 110, a neighbor node information manager 120, a routing executor 130, a neighbor node information database DB 140, and a transceiver 150.

The beacon message generator 110 loads neighbor node information, i.e., a list of addresses of neighbor nodes on a beacon payload to generate a beacon message.

The neighbor node information manager 120 extracts neighbor node information loaded on a beacon message received from another node to manage a neighbor node table stored in the neighbor node information DB 140.

The routing executor 130 performs mesh routing on the basis of the neighbor node table stored in the neighbor node information DB 140. Specifically, the routing executor 130 checks whether or not information on a destination node is included in the neighbor node table stored in the neighbor node information DB 140 and thereafter, performs routing differently in accordance with the checking result.

When the information on the destination node is included in the neighbor node table, the routing executor 130 extracts information on the next hop on a route to the destination node from the neighbor node table and transmits a message to a node corresponding to the extracted next hop through the transceiver 150.

On the contrary, if the information on the destination node is not included in the neighbor node table, when an address assignment scheme applied to the wireless AD-HOC network is address-based routable, the next hop is determined based on an address of the destination node and the message is transmitted to the node corresponding to the determined next hop through the transceiver 150. When the address assignment scheme applied to the wireless AD-HOC network is not address-based routable, an RREQ is broadcasted through the transceiver 150 and when an RREP is received as a reply for the RREQ, the message is transmitted to a node that transmits the RREP.

Meanwhile, when the routing executor 130 receives the RREQ from another node, the routing executor 130 checks whether or not the information on the destination node is included in the neighbor node table stored in the neighbor node information DB 140. As a result, when the information on the destination node is included in the neighbor node table, the routing executor 130 transmits the RREP to a source node and when the information on the destination node is not included in the neighbor node table, the routing executor 130 continuously relays the RREP.

The neighbor node DB 140 stores the neighbor node table.

The transceiver 150 is used to transmit the message to another node or receive the message from another node, for example, transmits and receives a beacon message, data and commands.

As set forth above, according to exemplary embodiments of the present invention, in order to set a route for transmitting data or commands between nodes in a beacon-enabled wireless AD-HOC network, each node loads neighbor node information on a beacon payload and broadcasts the neighbor node information, and nodes that receive the broadcasted information generate and manage a neighbor node table by using the neighbor node information on the beacon payload to generate and manage the neighbor node table without generating additional control traffics and enable mesh routing on the basis thereof.

According to the exemplary embodiments, when a destination node is included in the neighbor node table, the data can be transmitted to a destination in accordance with information of the neighbor node table. Further, when the destination node is not included in the neighbor node table, the data is transmitted in accordance with an address assignment scheme applied to the network or a route request (RREQ) is broadcasted in order to set a route to the destination. Even in this case, since the neighbor node table is used, control traffic for routing is markedly reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A mesh routing method, comprising:
   broadcasting, by each node constituting a wireless AD-HOC network, a beacon message loading neighbor node information on a beacon payload;
   generating, by a node receiving the broadcasted beacon message, a neighbor node table by adding the neighbor node information loaded on the beacon payload to the neighbor node table; and
   performing, by a source node attempting to transmit data or commands, mesh routing based on a neighbor node table generated for the source node using a corresponding neighbor node information extracted from the beacon payload.

2. The mesh routing method of claim 1, wherein the neighbor node information is a list of addresses of neighbor nodes.

3. The mesh routing method of claim 1, wherein the beacon payload further includes a flag field for indicating that the neighbor node information loaded on the beacon payload is changed or marking the number of the neighbor node information segmented depending on the size of the beacon payload.

4. The mesh routing method of claim 1, wherein the performing of the mesh routing includes:
   checking, by the source node, whether or not information on a destination node is included in its own neighbor node table;
   extracting information on the next hop on a route to the destination node from the neighbor node table when the information on the destination node is included in the neighbor node table; and
   transmitting the data or commands to a node corresponding to the extracted next hop,
   wherein the extracting of the next hop information and the transmitting of the data or commands are repetitively performed until the data or commands reach the destination node.

5. The mesh routing method of claim 4, wherein the performing of the mesh routing further includes:
   determining the next hop on the basis of an address of the destination node when the information on the destination node is not included and the address assignment scheme applied to the wireless AD-HOC network is address-based routable; and
   transmitting the data or commands to a node corresponding to the determined next hop.

6. The mesh routing method of claim 5, wherein the node that is determined as the next hop to receive the data or commands checks whether or not the information on the destination node is included in its own neighbor node table and enters the extracting of the next hop information or the determining of the next hop depending on the checking result.

7. The mesh routing method of claim 4, wherein the performing of the mesh routing further includes:
   broadcasting, by the source node, an RREQ (Route Request) when the information on the destination node is not included and the address assignment scheme applied to the wireless AD-HOC network is not address-based routable;
   checking, by a node receiving the RREQ, whether or not the information on the destination node is included in its own neighbor node table;
   transmitting, by the node receiving the RREQ, an RREP (Route replay) to the source node when the information on the destination node is included in the neighbor node table of the node receiving the RREQ; and
   transmitting, by the source node, the data or commands to the node transmitting the RREP.

8. The mesh routing method of claim 7, further comprising continuously relaying, by the node receiving the RREQ, the RREP when the information on the destination node is not included in the neighbor node table of the node receiving the RREQ.

9. A mesh routing apparatus, comprising:
   a beacon message generator generating a beacon message by loading neighbor node information on a beacon payload;
   a neighbor node information manager managing a neighbor node table by adding neighbor node information loaded on a beacon message received from another node to the neighbor node table;
   a routing executor executing mesh routing based on the neighbor node table;
   a neighbor node information database storing the neighbor node table; and
   a transceiver transmitting and receiving a message to and from another node, and
   wherein the mesh routing is executed based on a neighbor node table generated to correspond with a source node and a destination node using the beacon message.

10. The mesh routing apparatus of claim 9, wherein the routing executor checks whether or not information on a destination node is included in the neighbor node table, when the information on the destination node is included in the neighbor node table, extracts information on the next hop on a route to the destination node from the neighbor node table, and transmits data or commands to a node corresponding to the extracted next hop.

11. The mesh routing apparatus of claim 10, wherein the routing executor determines the next hop on the basis of an address of the destination node when the information on the destination node is not included and the address assignment scheme applied to the wireless AD-HOC network is address-based routable, and transmits the data or commands to a node corresponding to the determined next hop.

12. The mesh routing apparatus of claim 11, wherein the routing executor broadcasts an RREQ (Route Request) when the address assignment scheme applied to the wireless AD-HOC network is not address-based routable and transmits the data or command to the node transmitting an RREP (Route reply) when receiving the RREP as a replay for the RREQ.

13. The mesh routing apparatus of claim 12, wherein the routing executor checks whether or not the information on the destination node is included in the neighbor node table when receiving the RREQ from another node, transmits the RREP to the source node when the information on the destination node is included, and continuously relays the RREP when the information on the destination node is not included.

* * * * *